United States Patent [19]

Cornell

[11] 4,397,987

[45] Aug. 9, 1983

[54] NITRILE RUBBER/EPDM GRAFT BLENDS

[75] Inventor: Robert J. Cornell, Naugatuck, Conn.

[73] Assignee: Uniroyal, Inc., New York, N.Y.

[21] Appl. No.: 422,063

[22] Filed: Sep. 23, 1982

Related U.S. Application Data

[63] Continuation of Ser. No. 168,873, Jul. 14, 1980, abandoned.

[51] Int. Cl.[3] .................... C08L 51/00; C08L 51/04; C08L 33/20

[52] U.S. Cl. .................................... 525/75; 525/66; 525/69; 525/72; 525/76; 525/78; 525/84; 525/86; 525/87

[58] Field of Search ........................... 525/72, 75, 87

[56] References Cited

U.S. PATENT DOCUMENTS

| | | | |
|---|---|---|---|
| 3,489,821 | 1/1970 | Witt et al. | 525/75 |
| 3,538,192 | 11/1970 | Bishop | 525/75 |
| 3,897,405 | 7/1975 | Son et al. | 525/75 |
| 3,981,958 | 9/1976 | Nakashima | 260/878 R |

FOREIGN PATENT DOCUMENTS

| | | | |
|---|---|---|---|
| 1194884 | 6/1970 | United Kingdom | 525/75 |

*Primary Examiner*—Carman J. Seccuro
*Attorney, Agent, or Firm*—Marvin Bressler

[57] ABSTRACT

Oil resistant, ozone resistant polymer blends are prepared by blending an Acrylonitrile/Butadiene polymer with an EPDM polymer which has had grafted onto it a polymer prepared by polymerizing onto the backbone a methacrylate monomer. The preferred EPDM graft polymer is a methylmethacrylate grafted onto the EPDM backbone.

5 Claims, No Drawings

NITRILE RUBBER/EPDM GRAFT BLENDS

This is a continuation of application Ser. No. 168,873 filed July 14, 1980, now abandoned.

BACKGROUND OF THE INVENTION

It is well known that blends of elastomers containing polar groups such as acrylonitrile-butadiene copolymers (NBR) are not compatable with hydrocarbon rubbers such as ethylene-propylene rubbers. It is possible, however, to blend nitrile rubbers with certain polar resins such as styrene/acrylonitrile/copolymer; see for example U.S. Pat. No. 2,439,202. Blends of nitrile rubber with acrylonitrile/butadiene/styrene resins (ABS) have been prepared; see for example Japanese Pat. No. S-7-5013369. These blends have also been prepared incorporating a third component such as poly(vinylchloride) (PVC); see for example U.S. Pat. No. 3,629,050.

Graft polymers of ethylene propylene terpolymers (EPDM) wherein the third monomer is a non-conjugated diene have been prepared wherein the graft polymer comprises styrene acrylonitrile resin (SAN) and other polymers. These grafts of SAN on an EPDM backbone are known as EPAS and are elastomeric in character when the resin side chain represents less than 60% by weight of the EPAS. EPAS has been successfully blended with SAN to prepare weather resistant, impact resistant resins; see for example U.S. Pat. Nos. 3,489,821 and 3,489,822.

NBR has good solvent resistance but poor ozone resistance and heat aging properties. The poor qualities are believed to be the result of sites of unsaturation in the backbone which permits scission of the polymer chain under certain adverse conditions. EPDM, on the other hand, has good heat aging and ozone resistance because its unsaturation sites are in side chains and make such polymers immune to scission of the backbone chain. However, these hydrocarbon rubbers, even in the cured state, have poor solvent resistance where they swell when attacked by hydrocarbon solvents.

It has been postulated that blends of EPDM and NBR would exhibit a desirable balance of heat, ozone and solvent resistance. These rubbers are incompatible, however, and blends thereof are not homogeneous. Consequently, they have poor physical properties such as tensile, modulus, elogation and tear strength and are of limited practical use.

SUMMARY OF THE INVENTION

It has surprisingly been found that where EPDM is grafted with monomers such as methylmethacrylate it becomes compatible with oil resistant elastomers such as NBR or polymers of epichlorohydrin, ethylene-vinylacetate, chloroprene, etc. and blends of these rubbers exhibit good physical properties both as a fully cured rubber vulcanizate and as partially cured blends yielding thermoplastic elastomers.

Physical properties as well as rheological characteristics of the blends may be varied by altering the ratio of EPDM to graft monomers in the graft polymer.

DETAILED DESCRIPTION OF THE INVENTION

This invention relates to blends of oil resistant elastomers with modified EPDM rubbers. More particularly it relates to blends of oil resistant elastomers with an EPDM which has been made compatable with oil resistant elastomers by grafting an acrylate monomer onto the EPDM backbone.

The term "EPDM" as used in the specification and claims is used in a broader sense than its ASTM definition and means terpolymers of ethylene and propylene with an ethylenically unsaturated non-conjugated diene monomer as well as ethylene-propylene copolymer. Illustrative non-limiting examples of the dienes which may be used are dicyclopentadiene, methylidenenorbornene, ethylidenenorbornene and 1,4 hexadiene.

Though the EPDM may contain about 15% to about 80% by weight of propylene it more typically comprises about 30% to about 50% by weight propylene. The EPDM has incorporated into it about 0% to about 15% non-conjugated diene. Typically, the diene content gives rise to iodine numbers of about 5 to about 30. The Mooney Viscosity (ML-4 at 257° F.) is typically about 40 to about 100.

Methods of preparing the EPDM graft polymers are well known in the art. For example an EPDM/methyl methacrylate graft polymer may be prepared by grafting methyl methacrylate to the EPDM backbone in the manner taught in U.S. Pat. Nos. 3,489,821; 3,489,822 and 3,642,950 all of which are incorporated by reference.

The term "EPG" as used in the specification and claims means an EPDM polymer onto which has been grafted at least one polar monomer.

The term "polar monomer" as used in the specification and claims means acrylic acid, methacrylic acid and esters of these acids, such as methyl methacrylate and vinylacelate as well as di-n-butylitaconate, vinylchloride, itaconic acid or mixture thereof. It is readily apparent that any EPG prepared by the aforegoing prior art methods using any of the polar monomers described or mixture of these monomers may be used in the practice of this invention.

In the course of preparing the EPG not all of the resin monomers will be grafted onto the backbone. As used in the specification and claims the ungrafted polymer so formed is termed "free resin". Generally, the free resin has the same composition as the resin grafted to the EPDM. The term "graft resin" as used in the specification and claims means the monomer mixture which has been polymerized and grafted onto the EPDM. Though EPG polymers have been prepared wherein the graft resin comprises about 5% to about 50% by weight of the total EPG, for the purposes of this invention the graft resin comprises about 5% to about 95% by weight of graft resin; more preferably about 10% to about 60%; most preferably about 10% to about 20%; e.g., 15%.

In the preparation of EPG, ungrafted EPDM can be present in the final product as well as free resin. Additionally, resin or polymer similar to the free resin and EPDM may be added to the EPG for use in this invention. The preferred EPG is a graft of methylmethacrylate-grated EPDM.

The preferred oil resistant elastomer is an acrylonitrile containing elastomer e.g. nitrile rubber (NBR). The NBR which may be used in the practice of this invention includes any of the acrylonitrile-butadiene copolymers which are well known in the art. These polymers can contain a minor amount of a third monomer such as divinylbenzene. Though the oil resistant elastomer can comprise about 20 to about 50 weight percent acrylonitrile it preferably is comprised of about 33 to about 45 weight percent acrylonitrile. The commercially available nitrile rubbers useful in the practice of this invention are preferably characterized in having a weight average molecular weight (Mw) of about 2 to about $12\times10^5$ and a number average molecular weight (Mn) of about 4 to about $10\times10^4$. The Mooney Viscosity (ML-4 at 212° F.) for such polymers is about 30 to about 90).

In addition to the oil resistant elastomer and EPG the compositions of this inven on can include any of the conventional additives, fillers and curatives used in the preparation of EPDM and the compositions, including fillers such as carbon black, calcium carbonate, magnesium oxide, etc.; curatives; stabilizers such as antioxidants; lubricants—both solid and liquid; extenders and rubber processing oils. Reinforcing fillers such as carbon black can be incorporated in amounts of about 10 to about 100 parts by weight per 300 parts of NBR/EPG blend; preferably about 60 to about 150 parts. Other fillers such as silica and calcium carbonate can also be used.

The NBR/EPG blends of this invention may be used in either the cured or uncured state depending on the intended application and properties desired. For example, where good solvent and ozone resistance is required a full cure similar to that conventionally used in vulcanizing NBR and EPDM rubbers can be utilized. Where it is desired to prepare a blend which can be reprocessed by extrusion, injection molding etc., i.e., thermoplastic elastomers (TPE), either lower levels of curative or no curative is used. Typical curative levels for TPE application range from about 0% to about 40% of the amount necessary for full cure. For typical TPE type curing processes, see U.S. Pat. Nos. 3,835,201; 3,806,558; and 3,758,643, incorporated herein by reference.

The proportion of NBR to EPG in the blends of this invention is about 95/5 to about 5/95; preferably about 90/10 to about 60/40; most preferably about 80/20 to about 50/50 NBR/EPG. It is also within the scope of this invention to include into the compositions minor amounts of a third compatible resin. For example, where an EPAS is prepared the NBR/EPAS blend can have incorporated into it a minor amount of SAN resin. The third resin can be incorporated at about 2 to about 30 weight percent based on the overall composition; more preferably about 5 to about 20 weight percent, e.g., 10 weight percent.

The compositions of this invention may be prepared by an conventional rubber blending methods such as the use of 2-roll mills or internal mixers such as Banbury ®, Ko-Kneader ®, etc.

The tests used in evaluating the compositions of this invention include Stress-Strain tests including Modulus, Tensile Strength and % Elongation (ASTM D-412); Oil Swell tests (ASRM D-471-72 at 212° F. for 70 hours), Ozone resistance and Shore Hardness (ASTM D-2240). The ozone test (MEOT) was carried out by determining the time to appearance of cracks on a dumbbell-shaped sample elongated to varying degrees in an ozone chamber containing 50 ppm ozone at 100° F. A second test (Bent Loop test) wherein a bent loop of sample specimen (1"×4") is tested in the same manner as the dumbbell sample except that no strain other than the effect of bending 180° is applied to the sample.

Although the invention has been described in terms of NBR/EPG compositions, what applies to those compositions also applies to the other oil resistant polymer/EPG compositions of this invention. The advantages of the instant invention may be more readily appreciated by reference to the following examples. The term "EPMM" as used hereinafter means an EPG where the monomer grafted to the EPDM is methylmethacrylate.

The following components were used in the examples described below.

| CHEMICAL COMPOSITION OF MATERIALS USED: |
|---|
| A. Elastomers |
| 1. Hycar 4041<br>An acrylate elastomer sold by B. F. Goodrich Chemical Company. |
| 2. Hydrin 100 and Hydrin 200<br>Epichlorohydrin elastomers sold by B. F. Goodrich Chemical Company. |
| 3. Viton A<br>Fluoro elastomer sold by the Elastomer Chemicals Department, E. I. DuPont de Nemours & Company. |
| 4. Vynathene EY 906; 55% vinyl acetate; ML-1 + 4 (212° F.) = 20 Ethylene vinyl acetate copolymer sold by U.S.I. Chemicals. |
| 5. Neoprene W<br>Chloroprene Rubber sold by the Elastomer Chemicals Department; E. I. DuPont de Nemours & Company. |
| 6. Hypalon 40; 35% Cl/1% S/ ML-1 + 4 (212° F.) = 55<br>A chlorosulfonated polyethylene elastomer sold by the Elastomer Chemicals Department; E. I. DuPont de Nemours & Company |
| 7. CPE 3623; 36% Cl<br>A chlorinated polyethylene elastomer sold by the Dow Chemical Company. |
| 8. Adiprene-C<br>A polyurethane elastomer sold by the Elastomers Chemicals Department; E. I. DuPont de Nemours & Company. |
| 9. Vamac N-123; ML-1 + 4 (212° F.) = 30 81% Polymer<br>An ethylene/acrylic elastomer sold by the Elastomers Chemicals Department; E. I. DuPont de Nemours & Company. |
| 10. Parel-58; 55-70 Mooney<br>Copolymer of propylene oxide and allyl glycidyl ether sold by Organics Department of Hercules, Inc. |
| 11. EPMM #12<br>G = 0.11<br>$I.V._{(DMF)30^\circ C.}$ = 0.65 dl/g |
| B. Compounding Materials |
| 1. NBC = Nickel dibutyl dithiocarbamate |
| 2. Maglite-D = Magnesium oxide |
| 3. Agerite White = N,N'—dibetanaphthyl para-phenylene diamine |
| 4. Agerite Resin D = Polymerized trimethyl dihydroquinoline |
| 5. DIAK #1 = Hexamethylene diamine carbamate |
| 6. ROYALAC 140 = Zinc octadecylisopropyl dithiocarbamate |
| 7. ROYALAC 139 = Bis octadecylisopropyl thiuram disulfide |
| 8. DELAC S = N—cyclohexyl-2-benzothiazole sulfenamide |
| 9. Dyphos = Dibasic lead phosphite |
| 10. TE-70 = Processing aid sold by Techinal Processing |
| 11. NA-22 = 2-mercaptiomidazoline |
| 12. DiCup 40 = 40% active dicumyl peroxide |
| 13. MBTS = Benzothiazyl disulfide |
| 14. Tetrone A = Dipentamethylene thiuram tetrasulfide |
| 15. MBT = 2-mercaptobenzothiazole |
| 16. Caytur 4 = Crosslinking catalyst for sulfur curable polyurethanes sold by E. I. DuPont de Nemours & Company. |
| 17. DPG = Diphenyl quanidine |
| 18. MDA = Methylene dianiline |
| 19. MONEX = Tetramethyl thiuram monosulfide |
| 20. Red Lead = More than 90% red lead oxide. |

EXAMPLE 1

This experiment was conducted to demonstrate that grafting of methyl methacrylate onto EPDM is necessary to attain compatibility in NBR/EPMM blends.

Stock 1 contains EPMM #1 graft (85% EPDM/15% polymethyl methacrylate), which is part of the invention. Degree of grafting is 0.08 and free resin intrinsic viscosity is 0.47 (30° C. DMF). Stock 2, which is outside the invention, is a mechanical blend (solvent mixed) of the same composition of nitrile rubber, polymethyl methacrylate, and EPDM rubber. The oil resistant nitrile elastomer employed is a butadiene-acrylonitrile copolymer having an acrylonitrile content of about 33% and a Mooney viscosity of 75 (ML-4 at 212° F.). The polymethyl methacrylate resin employed, which was prepared by suspension polymerization, has an intrinsic viscosity of 1.03 (30° C. dimethylformamide). The EPDM #1 polymer employed an ethylene-propylene-5-ethylidene-2-norbornene terpolymer having an ethylene/propylene weight ratio of 57/43, an iodine number of 18 and a Mooney viscosity (ML-4 at 257° F.) of 52. The following compound recipes were used:

| Material | Parts | |
|---|---|---|
| | Stock 1 | Stock 2 |
| NBR #1 | 70 | 70 |
| Polymethyl Methacrylate | — | 4.5 |
| EPMM #1 Graft | 30 | — |
| EPDM #1 | — | 25.5 |
| Zinc Oxide | 5 | 5 |
| Stearic Acid | 1 | 1 |
| ROYALAC 140[1] | 1 | 1 |
| ROYALAC 139[2] | 1.5 | 1.5 |
| Sulfur | 1 | 1 |
| N—cyclohexyl-2-benzothiazolesulfenamide | 1 | 1 |

[1]ROYALAC 140 - Zinc N—octadecyl-N—isopropyl dithiocarbamate
[2]ROYALAC 139 - Bis (N—octadecyl-N—isopropyl thiuram disulfide)

The stocks were mixed in a Brabender Plasticorder (trademark) at mixing speeds between 25-40 rpm keeping stock temperature below about 105° C. The ingredients were charged in the following order of addition (not critical): rubbers, resin and vulcanizing agents—accelerators. The stocks were cured in a mold for 10 minutes at 320° F. (160° C.). Vulcanizate properties are determined by ASTM procedures D-412, D-2240 and D-471-72. The results are tabulated in TABLE I.

TABLE I

EPMM/NBR vs. EPDM/PMMA/NBR Blend

| Stock Number | 1 | 2 |
|---|---|---|
| EPMM #1 | 30 | — |
| P-MMA | — | 4.5 |
| EPDM #1 | — | 25.5 |
| NBR #1 | 70 | 70 |
| Physical Properties | | |
| 100% Modulus (psi) | 160 | 130 |
| Tensile Strength (psi) | 760 | 280 |
| % Elongation at Break | 420 | 270 |
| Shore (A) Hardness | 55 | 52 |
| % Volume Change #3 Oil, 70 hours at 257° F. | +89.1 | +111.6 |

The results indicate superior tensile strength, percent elongation at break and lower oil swell for the NBR/EPMM (Stock 1) blend of this invention in comparison to the three component blend of the same overall composition.

EXAMPLE 2

This example shows that the weight ratio of EPDM to methyl mthacrylate in the EPMM graft can be varied from 95/5 to 60/40 (Stocks 1,3,4). Stock 5 is a mechanical blend of NBR and EPDM, which is outside of the invention. The compositions of NBR #1, EPMM #1 and EPDM #1 used in this example are the same as in Example 1. The compositions of EPMM #2, and EPMM #3 grafts are as follows:

| | EPDM | EPDM/PMMA | I.V. PMMA (DMF, 30° C.) | Degree-Grafting |
|---|---|---|---|---|
| EPMM #2 | EPDM #1 | 95/5 | 0.15 | 0.02 |
| EPMM #3 | EPDM #1 | 60/40 | 1.33 | 0.31 |

The recipe and procedure are the same as those used in Example 1.

The physical properties of these stocks are summarized in TABLE II. The results indicate superior tensile strength, percent elogation at break and lower oil swell for Stocks 1, 2 and 3, which are part of the invention. The EPDM #1/NBR #1 blend exhibited poor tensile strength and a higher % volume change in #3 ASTM oil. Excellent improvement in compatibility is obtained even when the EPDM is grafted with only 5% methacrylate (Stock 2).

TABLE II

Use of Various Levels of MMA in EPMM Grafts for NBR/EPMM Blends

| Stock Number | 1 | 2 | 3 | 4 |
|---|---|---|---|---|
| EPMM #1 | 70 | — | — | — |
| EPMM #2 | — | 70 | — | — |
| EPMM #3 | — | — | 70 | — |
| EPDM #1 | — | — | — | 70 |
| NBR #1 | 30 | 30 | 30 | 30 |
| Physical Properties (Unaged) | | | | |
| 100% Modulus (psi) | 160 | 130 | 250 | 100 |
| 200% Modulus (psi) | 290 | 230 | 500 | 170 |
| Tensile Strength (psi) | 760 | 460 | 610 | 210 |
| % Elongation at Break | 420 | 350 | 250 | 250 |
| Shore (A) Hardness | 55 | 51 | 62 | 51 |
| % Volume Change ASTM #3 Oil, 70 hours at 257° F. | +89.1 | +106.1 | +66.5 | +151.9 |

EXAMPLE 3

This example shows that excellent compatibility, which is evident by superior physical properties, is obtained at varying ratios of EPMM and NBR polymers in the prepared blends. The NBR/EPMM weight ratio blends range from 95/5 to 5/95 (Stocks 6, 7, 8, 9 and 10). The NBR/EPDM blend counterparts, which are outside this invention, have also been run (Stocks 11, 12, 13, 14 and 15) to exhibit properties inferior to those of the compositions of this invention. Stocks 16 and 17 are NBR and EPDM polymers respectively. The compositions of NBR #1, EPMM #1 and EPDM #1 are described in Example 1. The recipe and procedure are essentially the same as in Example 1. The physical properties of these blends, in which the level of NBR #1 to EPMM #1 has been varied from 95/5 to 5/95 and compared to corresponding NBR #1/EPDM #1 blends, are summarized in TABLE III. Excellent physical properties (a measure of blend compatibility) were obtained at all ratios of NBR #1/EPMM #1. The molded test specimens are uniform in appearance which indicate excellent compatibility between the two polymers. Compared to their counterpart blends of NBR #1/EPDM #1 (Stocks 11, 12, 13, 14 and 15), compositions of this invention exhibit higher tensile strength and lower volume swell in #3 oils is obtained. The molded test specimens of NBR #1/EPDM #1 blends have a marbled appearance which visually indicates poor dispersion of the two polymers. The tensile strength reaches a maximum (Stock 8) for the 50/50 NBR #1/EPMM #1 blend, where as the corresponding 50/50 NBR #1/EPDM #1 blend (Stock 13) is quite poor.

TABLE III

Physical Properties
Blends: Various EPMM/NBR Ratios vs. EPDM/NBR Ratios

| Stock Number | 6 | 7 | 8 | 9 | 10 | 11 | 12 | 13 | 14 | 15 | 16 | 17 |
|---|---|---|---|---|---|---|---|---|---|---|---|---|
| EPMM #1 | 5 | 30 | 50 | 70 | 95 | — | — | — | — | — | — | — |
| NBR #1 | 95 | 70 | 50 | 30 | 5 | 95 | 70 | 50 | 30 | 5 | 100 | — |
| EPDM #1 | — | — | — | — | — | 5 | 30 | 50 | 70 | 95 | — | 100 |
| Physical Properties (Unaged) | | | | | | | | | | | | |
| 100% Modulus (psi) | 180 | 200 | 230 | 240 | 270 | 160 | 140 | 170 | 170 | 140 | 200 | 150 |
| 200% Modulus (psi) | 310 | 340 | 380 | 440 | 560 | 240 | 230 | 270 | — | — | 360 | 250 |
| Tensile Strength | 540 | 850 | 1200 | 990 | 910 | 510 | 370 | 300 | 260 | 250 | 620 | 380 |
| % Elongation at Break | 350 | 440 | 450 | 350 | 260 | 410 | 310 | 230 | 180 | 180 | 340 | 290 |
| Shore (A) Hardness | 55 | 57 | 58 | 59 | 58 | 55 | 53 | 53 | 54 | 53 | 54 | 52 |
| % Volume Change ASTM #3 Oil, 70 hours at 212° F. | +26.6 | +81.9 | +128.9 | +172.4 | +202.5 | +28.9 | +105 | (a) | (a) | +258.7 | +20 | +255.2 |

(a) Sample disintegrated in oil.

EXAMPLE 4

This example demonstrates that various types of nitrile rubbers can be used to prepare compatible blends with EPMM grafts. The weight percent acrylonitrile in the nitrile rubber was varied from 20% to 47% (Stocks 18, 19, 20 and 21). Corresponding NBR/EPDM blends were also prepared to demonstrate the improvement in blend compatibility (Stocks 22, 23, 24 and 25). EPDM #1, EPMM #1 and NBR #1 compositions are described in Example 1. The composition of the nitrile rubbers used are the following:

| Butadiene-Acrylonitrile Copolymer | % ACN | Mooney Viscosity (ML-4 @ 212° F.) |
|---|---|---|
| NBR #2 | 23 | 50 |
| NBR #3 | 40 | 65 |
| NBR #4 | 45 | 50 |

The receipe and procedure are the same as those used in Example 1. The physical properties of these blends are presented in TABLE IV. The improvement in compatibility is more pronounced as the nitrile content is increased. The compatibility was so poor for comparative Stocks 24 and 25 (outside the invention) that test specimens could not be molded from the prepared blends. Uniform blends were readily prepared for all NBR/EPMM blends having physical properties superior to those of the comparative blends (Stocks 22 and 23).

TABLE IV

Physical Properties
NBR/EPMM (Varying Nitrile Content in NBR) vs. NBR/EPDM Blends

| Stock Number | 18 | 19 | 20 | 21 | 22 | 23 | 24 | 25 |
|---|---|---|---|---|---|---|---|---|
| EDDM #1 | — | — | — | — | 30 | 30 | 30 | 30 |
| EPMM #1 | 30 | 30 | 30 | 30 | — | — | — | — |
| NBR #1 | — | 70 | — | — | — | 70 | — | — |
| NBR #2 | 70 | — | — | — | 70 | — | — | — |
| NBR #3 | — | — | 70 | — | — | — | 70 | — |
| NBR #4 | — | — | — | 70 | — | — | — | 70 |
| Physical Properties (Unaged) | | | | | | | | |
| 100% Modulus (psi) | 210 | 240 | 250 | 210 | 150 | 170 | — | — |
| 200% Modulus (psi) | 390 | 400 | 430 | 350 | 240 | 290 | — | — |
| Tensile Strength | 470 | 1100 | 1430 | 1200 | 380 | 340 | — | — |
| % Elongation at Break | 250 | 450 | 470 | 470 | 310 | 230 | — | — |
| Shore (A) Hardness | 50 | 54 | 56 | 59 | 47 | 50 | — | — |
| % Volume Change ASTM #3 Oil, 70 hours at 212° F. | +122.9 | +88.7 | +57.4 | +50 | +154.7 | +126.4 | — | — |

(a) Sample disintegrated in oil.

EXAMPLE 5

This example demonstrates the ability to use various types of EPDM as the base rubber for preparing EPMM grafts. Blends of these EPMM grafts with NBR were prepared (Stocks 26, 27, 28, 29 and 30) and compared to corresponding EPDM/NBR blends (Stocks 31, 32, 33, 34 and 35, which are outside this invention), to illustrate the improvement in blend compatibility. The composition of the various EPDM and EPMM grafts used are the following (TABLE V). The receipe and procedure are essentially the same as in Example 1. The physical properties of these blends are presented in TABLE IV.

EPMM grafts of this invention resulted in smooth uniform blends with NBR. Higher tensile strength and lower oil swell are obtained for blends of this invention (Stocks 26, 27, 28, 29 and 30) when compared to blends using their corresponding ungrafted EPDM base elastomers (Stocks 31, 32, 33, 34 and 35) blends outside the invention, were non-uniform in appearance.

TABLE V

Composition: EPDM and EPDM/Methyl Methacrylate 85/15 (EPMM) Grafts

| EPDM | Ethylene/ Propylene | Termonomer | Iodine Number | Mooney Viscosity(1) | EPMM(3) |
|---|---|---|---|---|---|
| EPDM #2 | 45/55 | — | — | 42(2) | EPMM #4 G = 0.03 I.V. = 0.45 |
| EPDM #3 | 53/47 | DCPD | 10 | 59 | EPMM #5 G = 0.06 I.V. = 0.59 |
| EPDM #4 | 56/44 | ENB | 10 | 55 | EPMM #6 G = 0.05 I.V. = 0.51 |
| EPDM #5 | 56/44 | 1,4-Hexa-diene | 10 | 55 | EPMM #7 G = 0.03 I.V. = 0.59 |
| EPDM #6 | 75/25 | ENB | 10 | — | EPMM #8 G = 0.08 I.V. = 0.28 |

(1)ML-1 + 4 @ 257° F.
(2)@ 212° F.
(3)G = Degree of Grafting
I.V. Intrinsic Viscosity of Free Methyl Methacrylate Resin (30° C. DMF)

TABLE VI

Physical Properties
Blends: NBR/EPMM vs. NBR/EPDM (Use of Various EPDM Base Polymers)

| Stock Number | 26 | 27 | 28 | 29 | 30 | 31 | 32 | 33 | 34 | 35 |
|---|---|---|---|---|---|---|---|---|---|---|
| NBR #1 | 60 | 60 | 60 | 60 | 60 | 60 | 60 | 60 | 60 | 60 |
| EPMM #4 | 40 | — | — | — | — | — | — | — | — | — |
| EPMM #5 | — | 40 | — | — | — | — | — | — | — | — |
| EPMM #6 | — | — | 40 | — | — | — | — | — | — | — |
| EPMM #7 | — | — | — | 40 | — | — | — | — | — | — |
| EPMM #8 | — | — | — | — | 40 | — | — | — | — | — |
| EPDM #2 | — | — | — | — | — | 40 | — | — | — | — |
| EPDM #3 | — | — | — | — | — | — | 40 | — | — | — |
| EPDM #4 | — | — | — | — | — | — | — | 40 | — | — |
| EPDM #5 | — | — | — | — | — | — | — | — | 40 | — |
| EPDM #6 | — | — | — | — | — | — | — | — | — | 40 |
| Physical Properties (Unaged) | | | | | | | | | | |
| 100% Modulus (psi) | 140 | 250 | 190 | 170 | 260 | 120 | 130 | 140 | 110 | 230 |
| 200% Modulus (psi) | 230 | 420 | 300 | 260 | 390 | 150 | 190 | 190 | 140 | 320 |
| % Elongation at Break | 370 | 360 | 460 | 400 | 420 | 290 | 240 | 370 | 440 | 260 |
| Shore (A) Hardness | 55 | 55 | 55 | 53 | 68 | 49 | 49 | 48 | 48 | 63 |
| Tensile Strength (psi) | 440 | 700 | 800 | 550 | 1030 | 180 | 220 | 320 | 210 | 380 |
| % Volume Change ASTM #3 Oil, 70 hours at 212° F. | +51.5 | +113 | +151.9 | +146.8 | +149(5) | +95.1 | +140 | +178 | +177.3 | +184.5(6) |

EXAMPLE 6

In this example EPDM is grafted with methyl acrylate (MA), butyl methacrylate (BuMA) and methacrylic acid (MAA) to illustrate the use of other monomers in preparing EPMM grafts for use in blends with NBR. The composition of NBR #1 and EPDM #1 is described in Example 1. The composition of these new EPMM polymers are as follows:

| | EPDM | EPDM/ Monomer | I.V. (30° C., DMF) Free Resin | Degree of Grafting |
|---|---|---|---|---|
| EPMM #9 | EPDM #1 | 92/8 (MA) | 0.38(7) | 0.016 |
| EPMM #10 | EPDM #1 | 85/15 (MAA) | 0.36 | 0.15 |
| EPMM #11 | EPDM #1 | 85/15 (BuMA) | 0.23 | 0.09 |

The recipe and procedure are essentially the same as in Example 1. The physical properties of blends between NBR #1 and these new EPMM grafts are summarized in TABLE VII. As seen in previous examples, blends containing the EPMM #9, #10 and #11 grafts and NBR #1 are quite compatible and uniform in appearance (Stocks 36, 37 and 38). Improved tensile strength and lower oil swell in #3 oil are also obtained for blends of this invention.

TABLE VII

Physical Properties
Blends: NBR/EPMM vs. NBR/EPDM
(Use of Different Grafted Monomers)

| Stock Number | 36 | 37 | 38 | 39 |
|---|---|---|---|---|
| NBR #1 | 60 | 60 | 60 | 60 |
| EPDM #1 | — | — | — | 40 |
| EPMM #9 | 40 | — | — | — |
| EPMM #10 | — | 40 | — | — |
| EPMM #11 | — | — | 40 | — |
| Physical Properties (Unaged) | | | | |
| 100% Modulus (psi) | 180 | 130 | 170 | 160 |
| 200% Modulus (psi) | 330 | 180 | 260 | 260 |
| Tensile Strength (psi) | 410 | 340 | 690 | 320 |
| % Elongation at Break | 280 | 380 | 450 | 280 |
| Shore (A) Hardness | 51 | 50 | 55 | 49 |
| % Volume Change #3 ASTM Oil, | | | | |

TABLE VII-continued

Physical Properties
Blends: NBR/EPMM vs. NBR/EPDM
(Use of Different Grafted Monomers)

| Stock Number | 36 | 37 | 38 | 39 |
|---|---|---|---|---|
| 70 hours at 212° F. | +112.4 | +138 | +130 | +161.5[(8)] |

EXAMPLE 7

In this example, improvement in vulcanizate properties are demonstrated for NBR/EPMM blends of this invention. These NBR/EPMM blends are compounded in a black low sulfur recipe (Stocks 40 and 42). Comparative blends, which are outside of this invention, were run using EPDM (Stocks 41 and 43). NBR #1, EPDM #1 and EPMM #1 are described in Example 1. NBR #3 is described in Example 4. The recipe used is as follows:

| | | |
|---|---|---|
| 100 | parts | Rubber |
| 70 | " | N-774 Black |
| 5 | " | Zinc Oxide |
| 1 | " | Stearic Acid |
| 3 | " | Zinc Salt Mercaptobenzimdazole |
| 1.5 | " | Stabilizer (Reaction Product Acetone and Diphenyl Amine sold by UNIROYAL) |
| 2 | " | N—t-butyl-2-benzothiazole sulfenamide |
| 3.5 | " | tetramethyl thiuram disulfide |
| 20.0 | " | TP-95 Plasticizing Agent (Diester) |
| 0.3 | " | Spider Sulfur |

The mixing procedure is essentially the same as in Example 1 except that black is added last. The compounded stocks are press cured for 30 minutes at 320° F. The vulcanizate properties for the two blends of this invention (Stocks 40 and 42) compared to NBR/EPDM blends (Stocks 41 and 43) are summarized in TABLE VIII. Excellent vulcanizate properties (tensile, percent elongation, air aging, oil swell and ozone resistance) are obtained for compounds of this invention. Comparative compounds (Stocks 41 and 43), which are outside this invention, have poorer vulcanizate properties.

TABLE VIII

Vulcanizate Properties (Black-Low Sulfur Recipe)
NBR/EPMM vs. NBR/EPDM Blends

| Stock Number | 40 | 41 | 42 | 43 |
|---|---|---|---|---|
| NBR #1 | 65 | 65 | — | — |
| NBR #3 | — | — | 65 | 65 |
| EPMM #1 | 35 | — | 35 | — |
| EPDM #1 | — | 35 | — | 35 |
| Physical Properties (Unaged) | | | | |
| 100% Modulus (psi) | 465 | 410 | 500 | 370 |
| 200% Modulus (psi) | 1105 | 970 | 1090 | 790 |
| Tensile Strength (psi) | 1685 | 1520 | 1725 | 1385 |
| % Elongation at Break | 315 | 330 | 335 | 370 |
| Shore (A) Hardness | 70 | 63 | 70 | 67 |
| % Volume Change #3 ASTM Oil, 70 hours at 212° F. | +43.2 | +49.0 | +36.2 | +39.5 |
| Air Aged, 70 hours, 302° F. | | | | |
| Tensile Strength (psi) | 1600 | 1460 | 1880 | 1620 |
| % Elongation at Break | 50 | 60 | 70 | 70 |
| Shore (A) Hardness | 89 | 86 | 90 | 88 |
| Ozone Resistance (50 pphm) MEOT 100° F. (Max time 168 hrs.) | | | | |
| 15% Elongation | OK | OK | OK | OK |

TABLE VIII-continued

Vulcanizate Properties (Black-Low Sulfur Recipe)
NBR/EPMM vs. NBR/EPDM Blends

| Stock Number | 40 | 41 | 42 | 43 |
|---|---|---|---|---|
| 25% Elongation | OK | OK | OK | OK |
| 35% Elongation | 96C | OK | OK | 96C |
| 45% Elongation | 24C | 96C | 144C | 24C |

C - Sample failed

EXAMPLE 8

In order to demonstrate that the results achieved with NBR can be achieved with any oil resistant elastomer a series of experiments were carried out with several other polymers. The results are shown in Tables IX and X.

TABLE IX

Blends of EPDM vs. EPMM Grafts
With Oil Resistant Elastomers

| Physical Properties | A | B | C | D | E |
|---|---|---|---|---|---|
| EPDM #6 | 60(a) | | 60(a) | | 60 |
| EPMM #12 | | 60 | | 60 | |
| HYCAR 4041 | | | | | |
| HYDRIN 100 | 40 | 40 | | | |
| HYDRIN 200 | | | 40 | 40 | |
| VYNATHENE (EY-906) | | | | | 40 |
| VITON-A | | | | | |
| Ivory Soap | | | | | |
| NBC | | | | 0.4 | |
| MAGLITE-D | | | | | |
| Zinc Oxide | | | | | 5 |
| Stearic Acid | | | | | 1 |
| Agerite White | | | | | |
| Agerite Reisn D | | 0.4 | | | |
| DIAK #1 | | | | | |
| ROYALAC 140 | | 0.6 | | 0.6 | |
| ROYALAC 139 | | 0.9 | | 0.9 | |
| Sulfur | | 0.6 | | 0.6 | |
| DALAC S | | 0.6 | | 0.6 | |
| DYPHOS | | 2 | | | |
| TE-70 | | 0.4 | | 0.4 | |
| NA-22 | | 0.6 | | 0.6 | |
| Red Lead | | | | 2 | |
| DiCup 40C | | | | | 5.6 |
| Tri Allyl Cyanurate | | | | | 0.4 |
| Cure Temp. | — | 310° F. | — | 310° F. | 325° F. |
| Cure Time | — | 30 min. | — | 30 min. | 15 min. |
| Physical Properties (Unaged) | | | | | |
| 100% modulus (ps.) | — | 220 | — | 240 | 180 |
| Tensile Str. (ps.) | — | 1630 | — | 1530 | 1050 |
| % Elongation | — | 430 | — | 480 | 460 |

| Physical Properties | F | G | H | I | J |
|---|---|---|---|---|---|
| EPDM #6 | | 60(a) | | 60(a) | |
| EPDM #6/MMA 80/20 [EPMM #12] | 60 | | 60 | | 60 |
| HYCAR 4041 | | | | 40 | 40 |
| HYDRIN 100 | | | | | |
| HYDRIN 200 | | | | | |
| VYNATHENE (EY-906) | 40 | | | | |
| VITON-A | | 40 | 40 | | |
| Ivory Soap | | | | | 1.40 |
| NBC | | | | | |
| MAGLITE-D | | | 6 | | |
| Zinc Oxide | 5 | | 3 | | 3 |
| Stearic Acid | 1 | | 0.6 | | 1.5 |
| Agerite White | | | 0.43 | | |
| Agerite Resin D | | | | | |
| DIAK #1 | | | 0.50 | | |
| ROYALAC 140 | | | 0.6 | | 0.6 |
| ROYALAC 139 | | | 0.9 | | 0.9 |
| Sulfur | | | 0.6 | | 0.7 |
| DALAC S | | | 0.6 | | 0.6 |
| DYPHOS | | | | | |

TABLE IX-continued

| Blends of EPDM vs. EPMM Grafts With Oil Resistant Elastomers | | | | | |
|---|---|---|---|---|---|
| TE-70 | | | | | |
| NA-22 | | | | | |
| Red Lead | | | | | |
| DiCup 40C | 5.6 | | | | |
| Tri Allyl Cyanurate | 0.4 | | | | |
| Cure Temp. | 325° F. | — | 320° F. | — | 320° F. |
| Cure Time | 15 min. | — | 30 min. | — | 30 min. |
| Physical Properties (Unaged) | | | | | |
| 100% Modulus (ps.) | 310 | — | 570 | — | 240 |
| Tensile Str. (ps.) | 1520 | — | 1400 | — | 990 |
| % Elongation | 420 | — | 380 | — | 380 |

(a)Compatibility so poor blend not cured

TABLE X

| | Blends of EPDM vs. EPMM Grafts With Oil Resistant Elastomers | | | | | | | | | | | |
|---|---|---|---|---|---|---|---|---|---|---|---|---|
| Physical Properties | K | L | M | N | O | P | Q | R | S | T | U | V |
| EPDM #6 | 60 | | 60 | | 60 | | 60 | | 60 | | 60 | |
| EPMM #12 | | 60 | | 60 | | 60 | | 60 | | 60 | | 60 |
| NEOPRENE W | 40 | 40 | | | | | | | | | | |
| HYPALON 40 | | | 40 | 40 | | | | | | | | |
| CPE 3623 | | | | | 40 | 40 | | | | | | |
| ADIPRENE-C | | | | | | | 40 | 40 | | | | |
| UAMAC N-123 | | | | | | | | | 40 | 40 | | |
| PAREL-58 | | | | | | | | | | | 40 | 40 |
| Zinc Oxide | 5 | 5 | 3 | 3 | 3 | 3 | 3 | 3 | 3 | 3 | 3 | 3 |
| Stearic Acid | 6 | 6 | 6 | 6 | | | 0.6 | 0.6 | 0.6 | .6 | 1 | 1 |
| MAGLITE D | 1.6 | 1.6 | | | 8 | 8 | | | | | | |
| ROYALAC 140 | 0.6 | 0.6 | 0.6 | 0.6 | | | 0.6 | 0.6 | 0.6 | .6 | 0.6 | 0.6 |
| ROYALAC 139 | 0.9 | 0.9 | 0.9 | 0.9 | | | 0.9 | 0.9 | 0.9 | .9 | 0.9 | 0.9 |
| Sulfur | 0.6 | 0.6 | 0.6 | 0.6 | | | 0.6 | 0.6 | 0.6 | .6 | 6 | 0.6 |
| DELAC S | 0.6 | 0.6 | 0.6 | 0.6 | | | 0.6 | 0.6 | 0.6 | .6 | 0.6 | 0.6 |
| N-22 | 0.3 | 0.3 | | | | | | | | | | |
| MBTS | | | 0.2 | 0.2 | | | 1.6 | 1.6 | | | | |
| TETRONE A | | | 0.8 | 0.8 | | | | | | | | |
| DiCup 40C | | | | | 8 | 8 | | | | | | |
| MBT | | | | | | | 0.8 | 0.8 | | | 0.6 | 0.6 |
| Cadmium Stearate | | | | | | | 0.2 | 0.2 | | | | |
| Caytur | | | | | | | 0.4 | 0.4 | | | | |
| DPG | | | | | | | | | 1.6 | 1.6 | | |
| MDA | | | | | | | | | 0.5 | 0.5 | | |
| Monex | | | | | | | | | | | 0.6 | 0.6 |
| Cure Temp. | 325° F. | 325° F. | 310° F. | 310° F. | 320° F. | 320° F. | 300° F. | 300° F. | 350° F. | 350° F. | 320° F. | 320° F. |
| Cure Time | 15 min. | 15 min. | 30 min. | 30 min. | 30 min. | 30 min. | 30 min. | 30 min. | 15 min. | 15 min. | 30 min. | 30 min. |
| Physical Properties (Unaged) | | | | | | | | | | | | |
| 100% modulus (ps.) | 200 | 380 | 460 | 810 | 380 | 520 | 210 | 350 | 220 | 410 | 170 | 290 |
| Tensile Str. (ps.) | 1760 | 2660 | 1000 | 1580 | 820 | 1940 | 1520 | 1910 | 1280 | 1870 | 790 | 1250 |
| % Elongation | 740 | 550 | 180 | 170 | 250 | 350 | 460 | 370 | 680 | 500 | 480 | 370 |

As used in the specifications and claims the term "oil resistant elastomers" means those elastomers which are resistant to swell when subject to oil exposure. Not wishing to be bound by theory it is believed this oil resistance is attributed to the incorporation into the polymer of polar groups such as nitrile, esters, halogens, etc.

EXAMPLE 10

In this example, peroxides are used to demonstrate the effectiveness of this type of cure system for blends of the invention. The recipe is as follows:

| | | |
|---|---|---|
| NBR #1 | 65 | part |
| EPMM #1 | 35 | part |
| N-774 Black | 70 | part |
| Zinc Oxide | 5 | part |
| Stearic Acid | 1 | part |
| Zinc Salt Mercaptobenzinidazole | 3 | part |
| Stabilize (Reaction Product Action and Diphenylamine sold by Uniroyal | 1.5 | part |
| TP-95 Plasticizing Agent Diester | 20.0 | part |

-continued

| | | |
|---|---|---|
| Decurmyl Peroxide (Dienup 40C) | 0.4 | part |

The vulcanizate properties of this example are as follows:

| | |
|---|---|
| Tensile strength (psi) | 2,000 |
| % elongation | 200 |

What is claimed is:

1. An elastomeric vulcanizable composition consisting essentially of:
   from 50 to 90 parts, by weight, butadiene-acrylonitrile copolymer elastomer and
   from 10 to 50 parts by weight, ethylene-propylene-non-conjugated diene terpolymer elastomer grafted with a monomer selected from the group consisting of alkyl acrylate and alkyl methacrylate wherein said alkyl radical in said monomer includes 1-4 carbon atoms;
   wherein said total elastomeric content of said composition is in the range of 80 and 99.5% by weight.

2. A composition in accordance with claim 1 wherein said non-conjugated diene is selected from the group consisting of dicyclopentadiene, 2-ethylidene-5-norbornene and 1,4-hexadiene.

3. A composition in accordance with claim 1 wherein said monomer is selected from the group consisting of methyl acrylate, methyl methacrylate and butyl methacrylate.

4. A composition in accordance with claim 1 also consisting of a vulcanizing agent present in sufficient amount to at least partially cure said composition.

5. A composition in accordance with claim 1 wherein the degree of grafting of said monomer to said ethylene-propylene-non-conjugated diene terpolymer is in the range of between 0.02 and 0.31.

* * * * *